United States Patent
Islam (10) Patent No.: US 11,545,918 B2
(45) Date of Patent: ***Jan. 3, 2023

(54) MAGNETICALLY DE-COUPLED, SEPARATELY CONTROLLED, MULTIPLE ELECTRIC MACHINE ASSEMBLY FOR DRIVING A COMMON SHAFT

(71) Applicant: Tula eTechnology, Inc., San Jose, CA (US)

(72) Inventor: Zakirul Islam, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,764

(22) Filed: Aug. 25, 2021

(65) Prior Publication Data

US 2021/0384851 A1    Dec. 9, 2021

Related U.S. Application Data

(63) Continuation of application No. 17/220,228, filed on Apr. 1, 2021, now Pat. No. 11,133,763.

(60) Provisional application No. 63/018,139, filed on Apr. 30, 2020.

(51) Int. Cl.
*H02P 5/747* (2006.01)
*B60K 1/02* (2006.01)
*H02K 51/00* (2006.01)

(52) U.S. Cl.
CPC ............... *H02P 5/747* (2013.01); *B60K 1/02* (2013.01); *H02K 51/00* (2013.01)

(58) Field of Classification Search
CPC .......... H02K 1/02; H02K 21/125; H02K 3/28; H02K 15/08; H02K 16/02
See application file for complete search history.

(56) References Cited

U.S. PATENT DOCUMENTS

| 4,441,043 A | 4/1984 | DeCesare |
| 7,768,170 B2 | 8/2010 | Tatematsu et al. |
| 8,773,063 B2 | 7/2014 | Nakata |
| 10,256,680 B2 | 4/2019 | Hunstable |

(Continued)

FOREIGN PATENT DOCUMENTS

| CN | 104716754 | 6/2015 |
| JP | 10243680 | 9/1998 |
| JP | 2018033250 | 3/2018 |

OTHER PUBLICATIONS

S. Sun, F. Jiang, T. Li and K. Yang, "Optimization of Cogging Torque in A Hybrid Axial and Radial Flux Permanent Magnet Machine," 2019 22nd International Conference on Electrical Machines and Systems (ICEMS), 2019, pp. 1-5, doi: 10.1109/ICEMS.2019.8921947. (Year: 2019).*

(Continued)

*Primary Examiner* — Said Bouziane
(74) *Attorney, Agent, or Firm* — Beyer Law Group LLP (57) ABSTRACT

A magnetically de-coupled, separately controlled, electric machine assembly including a radial and one or more axial electric machines, each with rotors mechanically coupled to and arranged to directly drive a single shaft. Each of the electric machines are independently, but cooperatively, controlled by an inverter unit that includes one or more inverters. The axial and radial electric machines are contained in a single housing.

31 Claims, 10 Drawing Sheets

(56) References Cited

U.S. PATENT DOCUMENTS

| 10,944,352 | B2 | 3/2021 | Mazda et al. |
|---|---|---|---|
| 2005/0151437 | A1 | 7/2005 | Ramu |
| 2009/0045691 | A1 | 2/2009 | Ichiyama |
| 2009/0146615 | A1 | 6/2009 | Zillmer et al. |
| 2013/0241445 | A1 | 9/2013 | Tang |
| 2014/0292382 | A1 | 10/2014 | Ogawa et al. |
| 2018/0323665 | A1 | 11/2018 | Chen et al. |
| 2019/0058374 | A1 | 2/2019 | Enomoto et al. |
| 2019/0288629 | A1 | 9/2019 | Tripathi |
| 2019/0288631 | A1 | 9/2019 | Tripathi |

OTHER PUBLICATIONS

Islam, U.S. Appl. No. 17/220,228, filed Apr. 1, 2021.
Ramsey, "How this father and son's new electric turbine could revolutionize electric cars; The Hunstable Electric Turbine can produce up to three times the torque of any other motor", https://www.autoblog.com/2020/03/08/hunstable-electric-turbine/?guccounter=1, Mar. 8, 2020.
Cai et al., "Torque Ripple Reduction for Switched Reluctance Motor with Optimized PWM Control Strategy", https://www.mdpi.com/1996-1073/11/11/3215, Oct. 15, 2018, 27 pages.
Spong et al., "Feedback Linearizing Control of Switched Reluctance Motors", IEEE Transactions on Automatic Control, vol. AC-32, No. 5, May 1987, pp. 371-379.
International Search Report and Written Opinion dated Jul. 21, 2021 from International Application No. PCT/US2021/025361.
Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC.2012.6397346, ISBN: 978-1-4673-1970.6.
Luckjiff et al., "Hexagonal $\Sigma\Delta$ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

* cited by examiner

MAGNETICALLY DE-COUPLED, SEPARATELY CONTROLLED, MULTIPLE ELECTRIC MACHINE ASSEMBLY FOR DRIVING A COMMON SHAFT

CROSS-REFERENCE TO RELATED APPLICATIONS

This application is a Continuation of U.S. application Ser. No. 17/220,228, filed on Apr. 1, 2021, which claims priority to U.S. Provisional Application No. 63/018,139, filed Apr. 30, 2020, both of which are incorporated by reference herein for all purposes.

The present application relates to electric machines, and more particularly, to a magnetically de-coupled, separately controlled, commonly housed assembly with two or more electric machines each with rotors mechanically coupled to and arranged to directly drive a single shaft.

BACKGROUND OF THE INVENTION

Electric motors convert electrical energy into mechanical energy. Electric generators are mechanically identical to an electric motor, but operate with a reversed flow of power, converting mechanical energy into electrical energy. The term "electric machine", as used herein, refers to a device that can operate as both a motor and a generator.

In general, electric machines operable as motors can be characterized within two broad categories; direct current (DC) or alternating current (AC). DC machines, which are powered by DC power sources such batteries or rectifiers, include, for example, permanent magnet DC machines, series DC machines, shunt DC machines and compound DC machines. AC machines, which are powered by alternating current (AC) sources, such as the power grid or inverters, include induction machines, synchronous machines (e.g., reluctance or permanent magnet synchronous machines). AC electric machines can be of single phase or multiple phases. The three-phase AC machines are more popular compared to single-phase or other multiphase machines.

Most electric motors operate through the interaction between the magnetic field of the rotor and electric currents through the windings or permanent magnets of the rotor. The interaction generates forces, which effectively rotates the shaft in the form of a torque. The magnetic fields create magnetic flux through the motor. Depending on the configuration, the flux generated between rotor and stator of a given motor is typically either radial or axial. With radial flux motors, the flux runs in and out from the rotor in a radial direction. Thus, the term "radial". In contrast, axial flux motors have flux that runs parallel to the shaft, along the axis of the shaft. Thus, the term "axial".

A motor design that uses windings that create both axial and radial flux is known. See for example U.S. Pat. No. 10,256,680, which describes an arrangement of motor windings in both axial and radial directions. With this arrangement, the windings work together to create a maximum force in the direction of motion. In other words, the axial and radial flux work together to generate a combined force.

Cooperatively using two separate motors together is also known. See for example U.S. Patent Publication 2013/0241445, which describes the use of two separate and distinct electric motors to drive an axle of an electric vehicle via a transmission/differential assembly. Each motor, however, is separately housed and includes its own shaft, separately coupled to the transmission/differential by separate gears respectively.

An electric machine assembly that includes two (or more) electric machines that are commonly housed, highly efficient, compact, relatively inexpensive, magnetically decoupled and independently controlled to directly drive a single shaft, is therefore needed.

SUMMARY OF THE INVENTION

The present application relates to an electric machine assembly that includes two (or more) electric machines that are magnetically decoupled and independently controlled to directly drive a single shaft.

In one non-exclusive embodiment, the electric machine assembly includes a single shaft, one or a plurality of axial flux electric machine(s) having rotors arranged to directly drive the shaft, one or a plurality of radial flux electric machine(s) having rotors arranged to directly drive the shaft. An inverter unit having one or more inverters, is configured to individually but cooperatively, control the axial flux electric machine(s) and the radial flux electric machine(s) respectively. One or more gaps is/are provided between each of the one or more radial and axial flux machines. In each case, the gap(s) is/are sufficiently large so as to effectively magnetically decouple any two adjacent electric machines.

In non-exclusive embodiments, the two or more electric machines, regardless of the type and/or configuration, are contained in a single housing.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The components of an electric machine typically include a stator, a rotor, shaft, bearings, an air gap, windings and housing. The stator is stationary and usually consists of windings. The rotor typically includes conductors that carry current or permanent magnets that interact with the magnetic field generated by the stator, causing the rotor to rotate. As the rotor rotates, it directly drives the shaft to deliver mechanical power or torque. The bearings, which are typically supported by the housing, allow the rotor to rotate about an axis. The shaft extends through the bearing beyond the housing, where a load is applied. The air gap is the space or distance between the rotor and stator. The air gap is preferably as small as possible since the required magnetizing current increases as the air gap increases. Windings are a set of coils made with wires that are typically wrapped around a magnetic core on the stator. Each winding is connected to an end terminal that supplies AC current into the machine. AC electric machines typically have multiple windings connected to multiple end terminals known as phase terminals. When the motors windings are supplied with AC currents shifted by their phases, they form magnetic poles, and generate magnetic flux that links the rotor and the stator.

For the sake of simplicity, the discussion below is largely described within the context of an electric machine assembly operating as a motor. It should be understood the assembly as described herein should in no way be limited to just motor operation. On the contrary, the electric machine assembly as described herein is also operable as a generator.

Radial Electric Machines

Figure 1A:
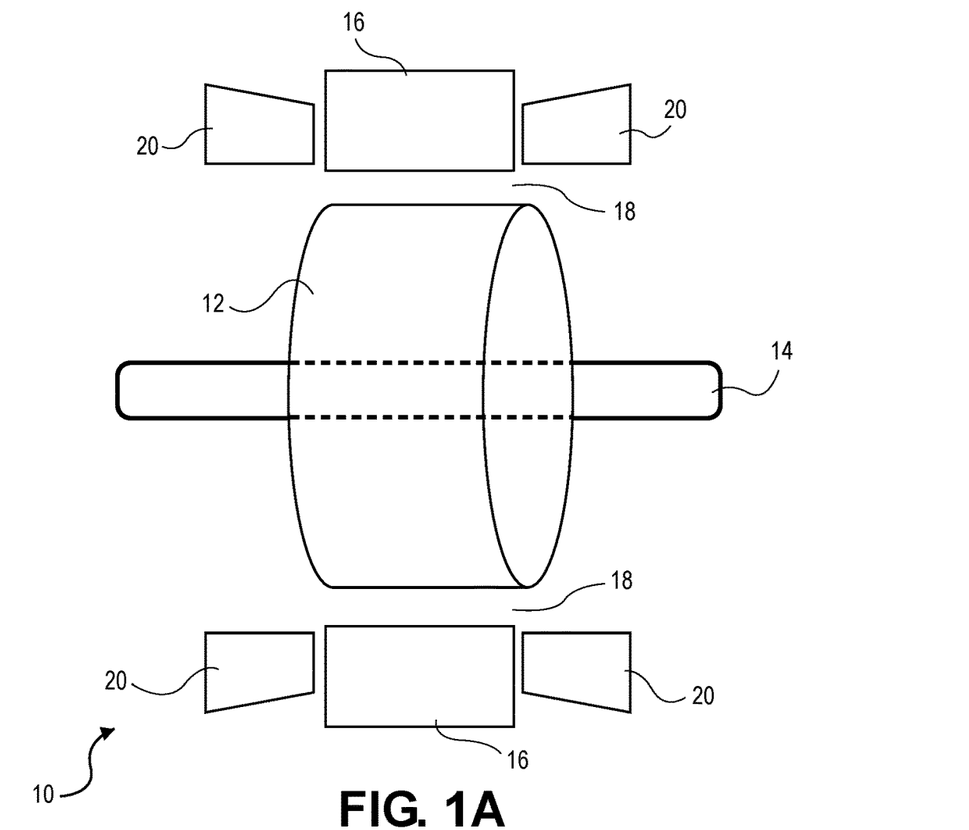
FIG. 1A, FIG. 1B and FIG. 1C illustrate a representative radial flux electric machine, radial flux and an efficiency map respectively.

Referring to FIG. 1A, a representative radial flux electric machine 10 is illustrated in a longitudinal view. The radial flux electric machine 10 includes a rotor 12 arranged to directly drive a shaft 14 and a stator 16 that surrounds the rotor 12. An air gap 18 is provided between the rotor 12 and the stator 16. For the sake of clarity, just a cross section of the stator 16 is illustrated. In actual embodiments, the stator 16 is arranged entirely around the circumference of the rotor 12, separated by the air gap 18.

In certain embodiments, one or more pairs of windings 20 are arranged around and extending outward from the stator 16. The windings 20 are arranged in a certain pattern based on the number of poles. It is well understood that a given electric machine design may include a wide range of poles. Electric machines with one, two, three, four, six poles and beyond are all common. As such, the number of windings 20 provided on the rotor 16 of a given electric machine 10 may widely vary.

Figure 1B:
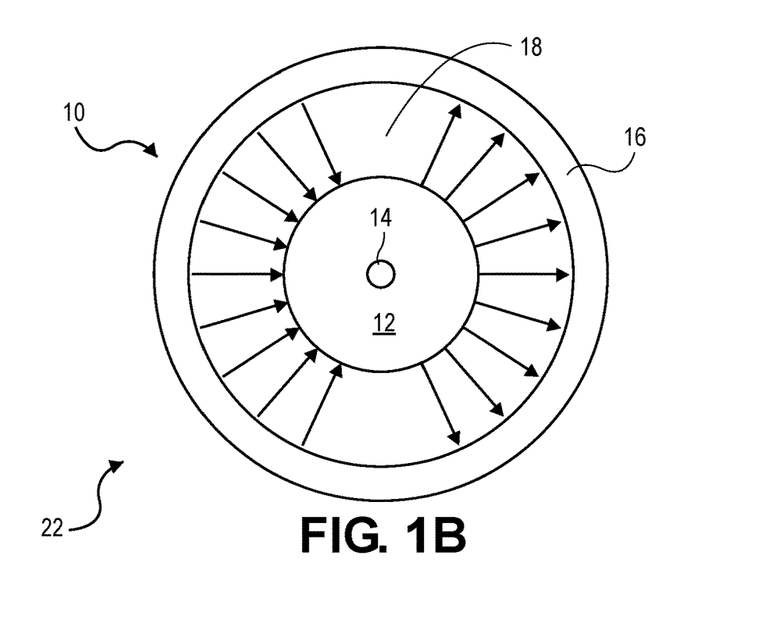

Referring to FIG. 1B, a diagram 22 showing a cross-section end view of the radial flux electric machine 10 is illustrated. As is evident in the diagram 22, the shaft 14, is provided in the center of the assembly and runs in/out of the page, is mechanically coupled to and directly turned by the rotor 12. The stator 16 completely surrounds the circumference of the rotor 12 separated by the air gap 18. The flux, represented by the arrows in the drawing, runs radially in and out with respect to the shaft 14. Hence, the electric machine 10 is a "radial flux" electric machine.

Figure 1C:
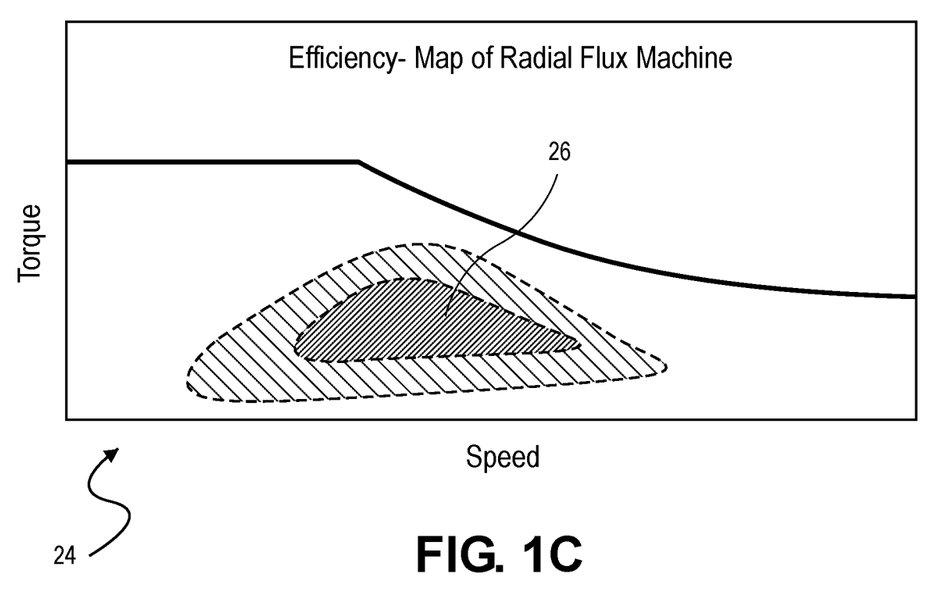

Referring to FIG. 1C, a representative efficiency map 24 for the radial flux motor 10 is illustrated. In the map 24, speed is provided along the horizontal axis, while torque is provided along the vertical axis. As depicted in the map 24, the radial flux electric machine 10 operates in its most efficient region 26 when the speed is relatively high and the torque demand is relatively low.

Axial Electric Machines

Figure 2A:
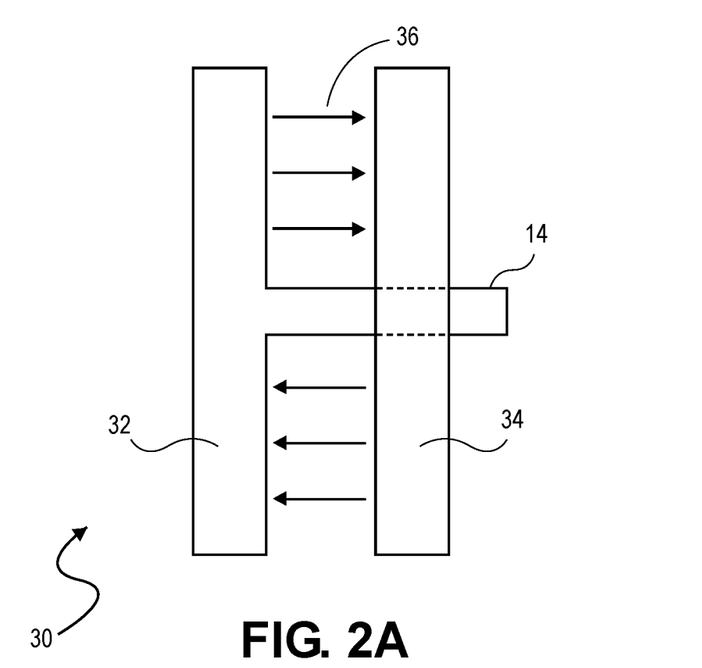
FIG. 2A and FIG. 2B illustrate a representative axial flux electric machine and an efficiency map respectively.

Referring to FIG. 2A, a cross-section of a representative axial flux electric machine 30 is illustrated. The axial flux electric machine 30 includes a rotor 32 arranged to directly drive a shaft 14 and a stator 34. The rotor 32 and stator 34 oppose one another, but are separated by an air gap 36. The flux, represented by the arrows in the drawing, runs axially in opposing directions between the rotor 32 and stator 34 and in parallel with respect to the shaft 14. Hence, the electric machine 30 is an "axial flux" electric machine.

Although not illustrated, the axial flux electric machine 30 may also include any number of poles. By distributing pairs of windings on the stator 34, any number of poles for the axial flux electric machine 30 may be defined. It should be understood, however, that the axial flux electric machine 30 as contemplated herein may have any number of poles.

Figure 2B:
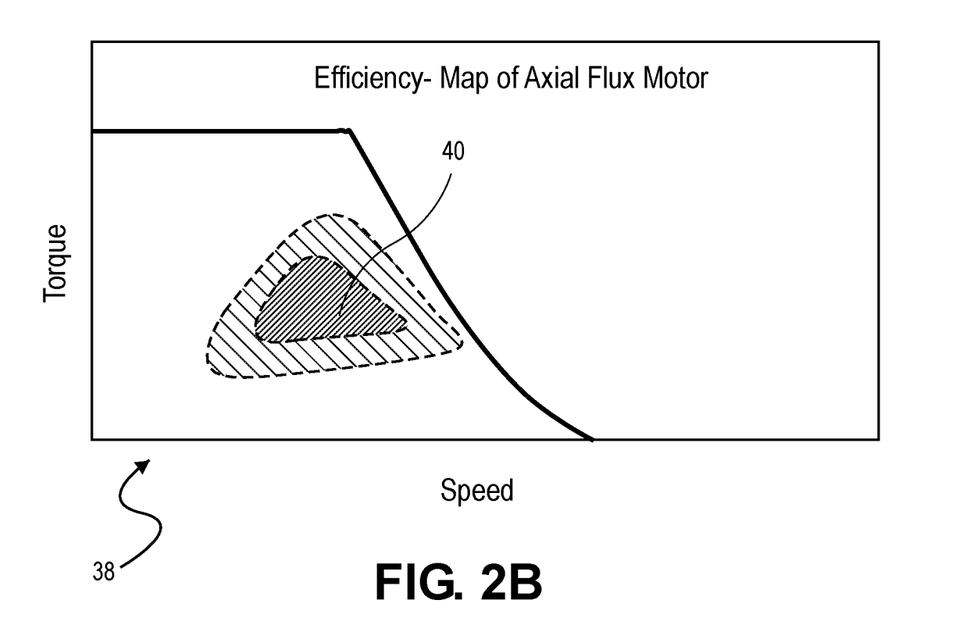

Referring to FIG. 2B, a representative efficiency map 38 for the axial flux motor 30 is illustrated. In the map 38, speed is provided along the horizontal axis, while torque is provided along the vertical axis. As depicted in the map 38, the axial flux electric machine 30 operates in its most efficient region 40 when the speed is relatively low.

Multiple Electrical Machine Embodiments

Figure 3A:
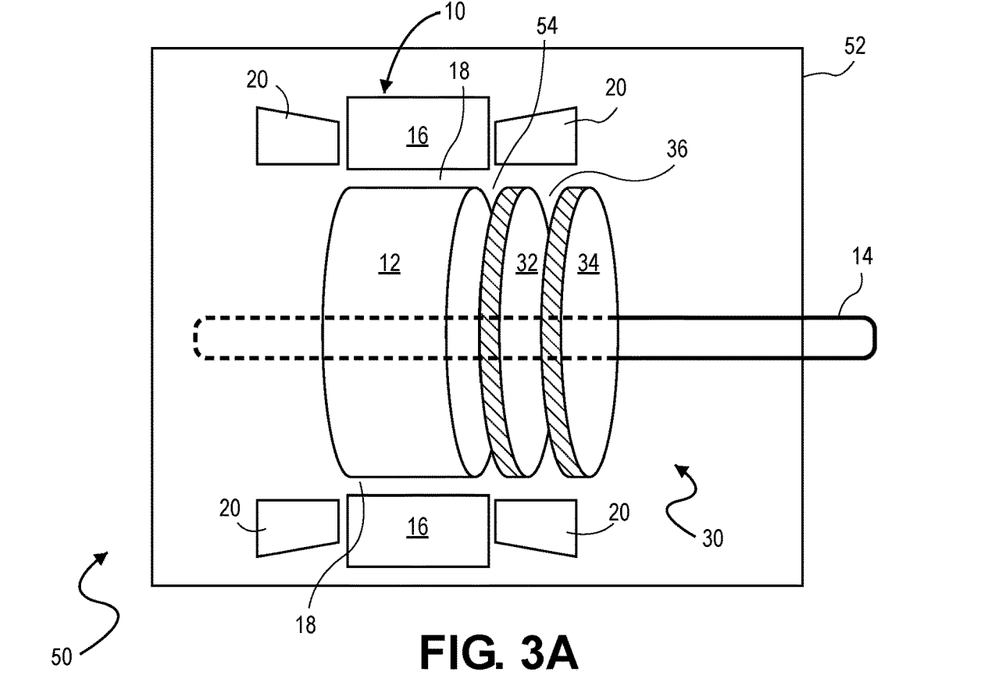
FIG. 3A illustrates a representative multiple electric machine assembly driving a single shaft accordance with a non-exclusive embodiment of the invention.

Referring to FIG. 3A, a representative multiple electric machine assembly 50 driving a single shaft 14 is illustrated. The multiple electric machine assembly 50 includes the radial electric machine 10 and at least one axial electric machine 30.

The radial electric machine 10 includes the rotor 12, stator 16, and windings 20. The gap 18 separates the rotor 12 and the stator 16.

At least one axial electric machine 30 includes rotor 32, stator 34 and the air gap 36 separating the two. As depicted in the drawing, the rotor 32 is positioned so as to be nested within the end windings 20 that are circumferentially arranged around and extending outward from the stator 16 of the radial electric machine 10. The stator 34 is positioned adjacent to, but separated from the rotor 32 by the air gap 36.

The multiple electric machine assembly 50, including the above-described components of the radial flux electric machine 10 and the axial flux electric machine(s) 30, are all included in a single housing 52. With this arrangement, the rotors 12, 32 the two electric machines 10, 30 directly drive a single shaft 14. Bearings (not illustrated for the sake of simplicity) support the shaft 14 within the housing and allow the shaft to rotate. In alternative embodiments, the bearings can also be magnetically supported within the housing 52. The housing 52 thus contains the two electric machines 10, 30, which each directly drive or turn the common shaft 14, which at least partially extends outside of the housing 52 where a load (not illustrated) is typically connected.

Figure 3B:
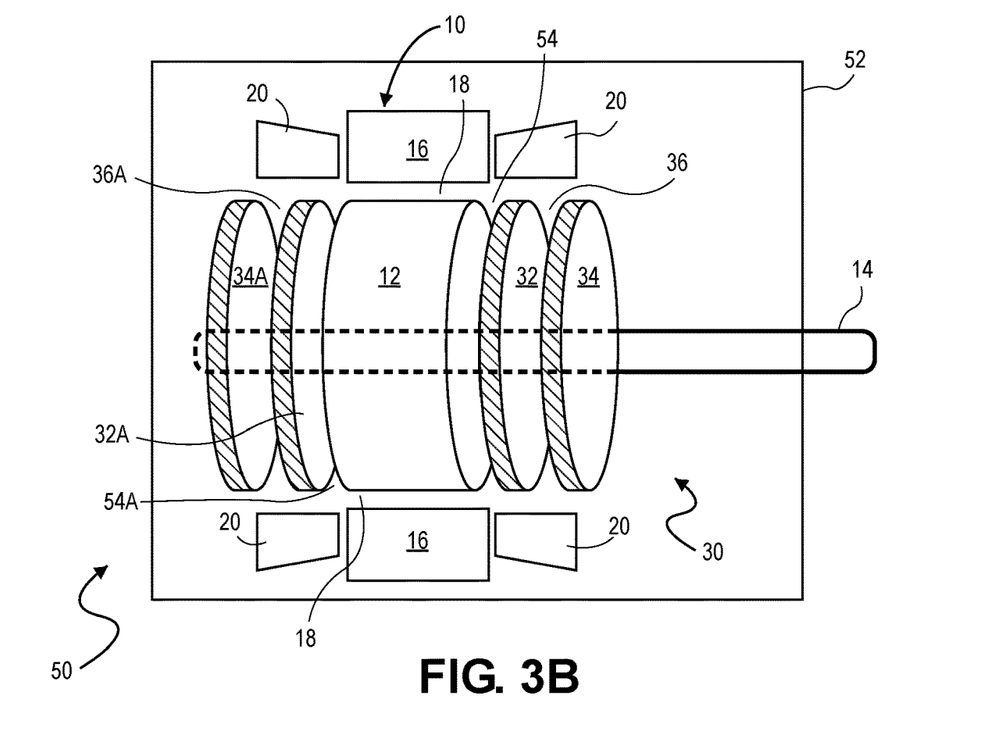
FIG. 3B illustrates a representative multiple electric machine assembly driving a single shaft in accordance with another embodiment of the invention.

Referring to FIG. 3B, an optional embodiment is illustrated. With this embodiment, a second rotor 32A and stator 34A, separated by an air gap 36A, are positioned on the opposing side of the radial flux electric machine 10. In a similar arrangement, the rotor 32 is nested within the one or more pairs of windings 20 that are circumferentially arranged around and extending outward from the stator 16 of the radial electric machine 10. The second stator 34A is positioned adjacent to, but separated from the second rotor 32A by the air gap 36A. The rotor 32A, which is supported by bearings (not illustrated), is arranged to directly drive or turn the common shaft 14. Both the second rotor 32A and stator 34A are enclosed in the housing 52.

As described in more detail below, the second rotor 32A and stator 34A can be operated in unison with the rotor 32 and stator 34 by a single inverter. In which case, the rotor-stator pair 32/34 and the second rotor-stator pair 32A/34A operate in unison as a single axial electric machine 30. Alternatively, each of the rotor-stator pair 32/34 and 32A/34A are separately operated by two inverters respectively. In which, case, the two inverter pairs 32/34 and 32A/34A define distinct axial flux electric machines 30 respectively.

The above describe arrangements of the multiple electric machine assembly 50 defines a number of noteworthy air gaps, including:

The first air gap 18, provided between the rotor 12 and the stator 16, defines the space in which radial flux runs in/out with respect for the shaft 14 for the radial flux electric machine 10.

Second air gap(s) 36 and possibly 36A between the axial electric machine rotor-stator pair 32/34 and optional stator-rotor pair 32A/34A. In each case, the air gap(s) 36 define the space in which axial flux runs in parallel with respect to the shaft 14.

Third gap(s) 54 and possibly 54A are provided between the rotor 12 of the radial flux electric machine 10 and the opposing surface of the rotor(s) 32 and possibly 32A of the axial electric machine(s) 10. With the radial electric machine 10 and the axial electric machine(s), their respective fluxes generally run perpendicular to one another and are maintained within their respective air gaps. However, some degree of flux leakage, albeit small, may still occur. It is therefore beneficial for the third air gap(s) 54/54A to be sufficient large so as to substantially magnetically decouple the various electric machines. In one particular embodiment, the Applicant has found that an air gap(s) 54/54A of approximately 2 or 3 millimeters is sufficient magnetically decouple the radial flux electric machine 10 and the axial flux electric machine(s) 30. It should be understood that this dimension is merely exemplary. In actual embodiments, air gap(s) 54/54A that is/are smaller or larger may be needed for the desired magnetic decoupling for a given implementation of the assembly 10.

Figure 3C:
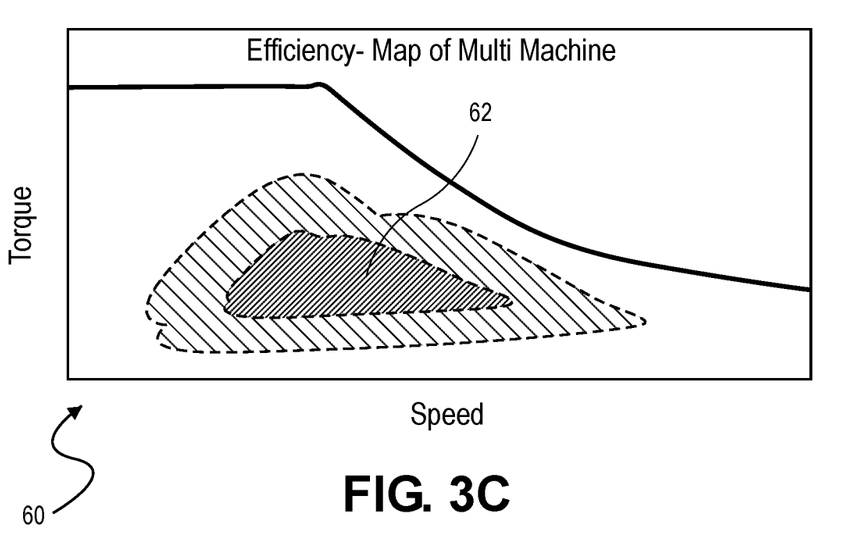
FIG. 3C illustrates a representative efficiency map for the multiple electric machine assembly in accordance with a non-exclusive embodiment of the invention.

Referring to FIG. 3C, a representative efficiency map 60 for the multiple electric machine assembly 50 is illustrated. In the map 60, speed is provided along the horizontal axis, while torque is provided along the vertical axis. As depicted in the map 60, the most efficient region 62 is significantly more expansive compared to the same in the maps 24 and 38 for the radial flux electric machine 10 and the axial flux electric machine 30 respectively. The ability to independently, but cooperatively, control the radial flux electric machine 10 and the axial flux electric machine(s) 30 within the multiple electric machine assembly 50 allows for a multi-prong operating strategy that can significantly improve efficiencies, particularly compared to operating each as a stand-alone electric machine. For instance, a multi-prong strategy may be used wherein:

(a) The axial flux electric machine(s) 30 is/are operated alone when torque demand is relatively low and the speed is relatively low;

(b) The radial flux electric machine 10 is operated alone regardless of the torque demand and the speed is relatively high; and (c) The radial flux electric machine 10 and the axial flux electric machine(s) 30 are both operated when the torque demand is high, but the speed is relatively low.

Thus, with the above described multi-prong strategy, any one or all of the electric machines can be operated at any point in time to efficiently meet operational conditions. Overall efficiency is thus improved over operating either of the electric machines 10 or 30 individually In addition, the two machines are capable of creating more total output (i.e., torque when motoring, electric energy when operating as a generator) when combined compared to either of the two machines operating independently.

It should be understood that the position of the most efficient region 62 as shown is merely exemplary and is dependent on the design and control of the motor drive. In practical applications, the radial flux and axial flux machines 10, 30 will typically be designed for a specific application. As such, the two electric machines will be designed and selected such that they are more efficient for different speed and torque regions as needed for a given application. Furthermore, the characteristics of the electric machines 10, 30 are typically selected so that when operated cooperatively, they offer better efficiency over a wider operating speed range and torque request range compared to operating either individually. The magnetic decoupling of the rotors 12, 32 and possibly allows each of them to individually operate at their peak efficiency region while the other machine is deactivated. With the two electric machines 10, 30 arranged to each directly drive or turn a common shaft 14 and maintained in a single housing 52, the assembly 50 offers a compact, efficient electric machine system.

Figure 3D:
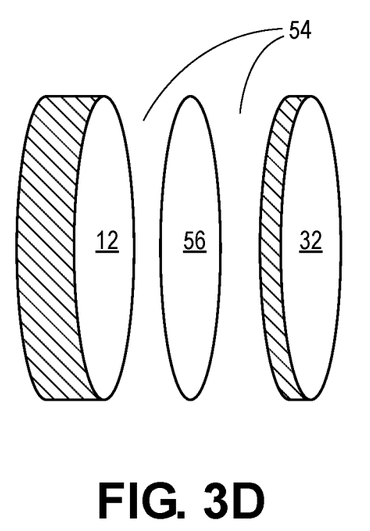
FIG. 3D illustrates an optional magnetic shield that may be used with the multiple electric machine assembly in accordance with a non-exclusive embodiment.

Referring to FIG. 3D, an optional magnetic shield 56 that may be used with the multiple electric machine assembly 50 is shown. In this embodiment, the magnetic shield 56 is positioned in the air gap 54 between the rotor 12 of the radial electric machine 30 and the rotor 32 of the axial electric machine 30. For the sake of clarity, the other components of the electric machines 10 and 30 as described above are not illustrated.

By making the shield 56 out of a non-magnetic material such as aluminum, further magnetic isolation between the two electric machines 10, 30 can be achieved. In embodiments where a second axial rotor-stator pair 32/34 is used, a second magnetic shield 56 (not illustrated) can be used in a similar manner. It should be understood that use of the shield 56 is not mandatory in many embodiments and that other non-magnetic materials besides aluminum may be used. More generally, in other embodiments, the gap 54 may be at least partially filled with a non-magnetic material Referring to FIG. 3E, another machine assembly 65 including three motors M1, M2 and M3 used to directly drive a common shaft 14 is illustrated. In this particular embodiment, the M1 motor is a radial flux motor and includes a rotor 12, a stator 16 and an air gap 18 between the two. The second motor M2 is an axial flux motor, which includes rotor 32A and stator 34A. The third motor M3 is also an axial flux motor, including the stator 34A and another rotor 32B. With this particular arrangement, the stator 34A is in common with the two motors M2 and M3, with the rotors 32A of M2 on the left and rotor 32B on the right respectively. Gaps are provided between (i) the rotor 12 of the radial flux motor M1 and the rotor 32A of M2 and (ii) the stator 34A and each of the rotors 32A and 32B of motors M2 and M3 respectively. Again, each of these gaps is sufficiently large so as to effectively magnetically decouple the electric machines M1, M2 and M3 from one another.

Figure 3E:
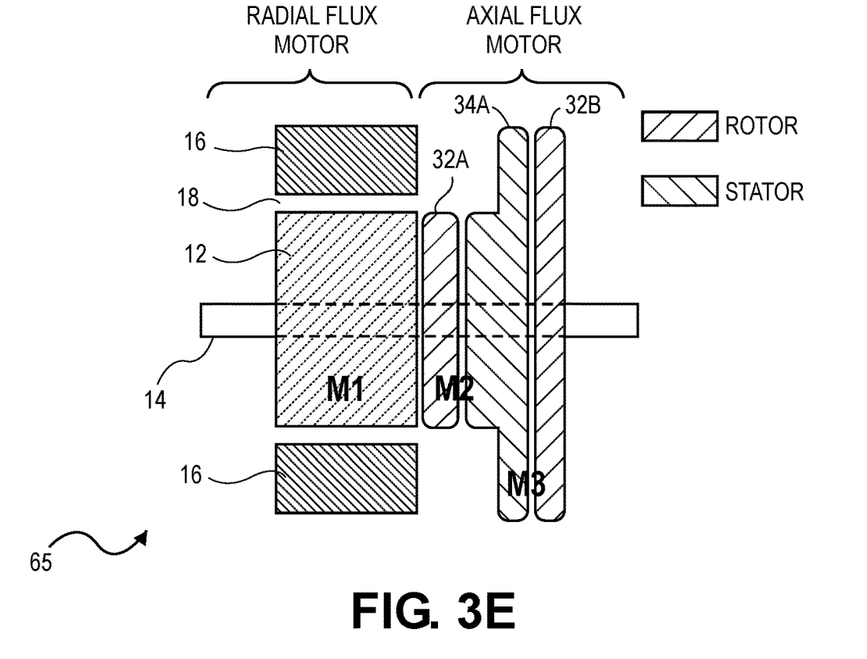
FIG. 3E and FIG. 3F each illustrate addition configurations including both radial flux and axial flux electric machines directly driving a single shaft in accordance with non-exclusive embodiments of the invention.
Figure 3F:
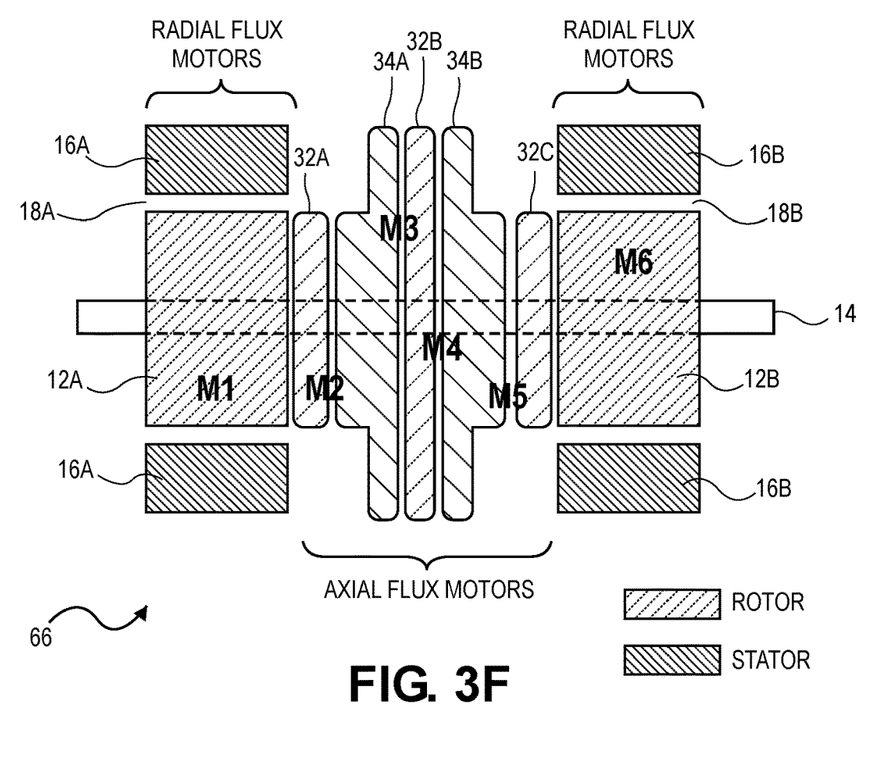

Referring to FIG. 3F, another machine assembly 66 including six motors M1 through M6 is illustrated. In this embodiment, the three motors M1, M2 and M3 are essentially the same as the commonly labeled motors of the FIG. 3E embodiment. Specifically M1 includes a rotor 12A, a stator 16A and an air gap 18A between the two. M2 includes rotor 32A and stator 34A, and M3 includes rotor 32B and stator 34A. Remaining motors M4, M5 and M6 are configured in essentially a mirror image arrangement as motors M1, M2 and M3 respectively. Specifically, axial motor M4 includes rotor 32B and stator 34B, axial motor M5 includes rotor 32C and stator 34B, and radial motor M6 includes rotor 12B, a stator 16B and an air gap 18B between the two. With this arrangement, all six motors M1 through M6 are arranged to directly drive the common shaft 14. Furthermore, the gaps between each of the motors M1 through M6 are sufficiently large so as to effectively magnetically decouple each motor from its adjacent motor or motors.

With the above-described arrangement, the stator 34A is in common with M2 and M3 and the stator 34B is in common with M4 and M5. With the gaps sufficiently large so as to effectively magnetically decouple adjacent motors, the torque of one motor is not reduced by leakage through the gap(s). As such, each motor M1 through M6 can be individually controlled when driving the common shaft 14 in such a way as to combine and maximize torque, without the detrimental effects of magnetic leakage between motors incidentally reducing the amount of applied torque.

With the embodiments of FIG. 3E and FIG. 3F, a similar multi-prong control strategy may be used. That is:

(a) The axial flux electric machines M2, M3 and/or M2 through M5 are operated alone when torque demand is relatively low and the speed is relatively low;

(b) The radial flux electric machine(s) M1 or M1 and M6 is/are operated alone regardless of the torque demand and the speed is relatively high; and (c) The radial flux electric machines M1 and/or M6 and the axial flux electric machine(s) M2, M3 and/or M2 through M5 are both operated when the torque demand is high, but the speed is relatively low.

It should be understood that the multi-prong strategy mentioned above is merely exemplary and should not be construed as limiting in any regard. In real world embodiments, any one, two or more, or all of the electric machines M1 through M3 for the FIG. 3E embodiment or M1 through M6 for the FIG. 3F embodiment can be operated at any point in time to efficiently meet operational conditions. In general, the selection of any one electric machine or multiple electric machines to operate is typically dependent on the torque demand and/or operating speed. By individually, but collectively controlling the individual motors, the amount of torque contribution from any individual motor, at any point in time, is determined in such a way that the overall efficiency of the multi-machine drive is maximized Improvements in operating efficiency of the various embodiments of the present invention as described herein are realized over prior art configurations, including (1) one or more of just type of electric machine (e.g., either radial only or axial only) or (2) multiple independent electric machines of different types (e.g., one or more radial or one or more axial) that are separately housed and/or drive individual shafts connected to a common load by linkages, gears, or the like. As a result, greater torque density can typically be achieved while operating at a higher overall efficiency. Alternatively, when the machines are operating as generators, power energy can be generated more efficiently compared to any of the above mentioned prior art arrangements of machines operating as generators.

Multiple Electric Machine Control

Figure 4:
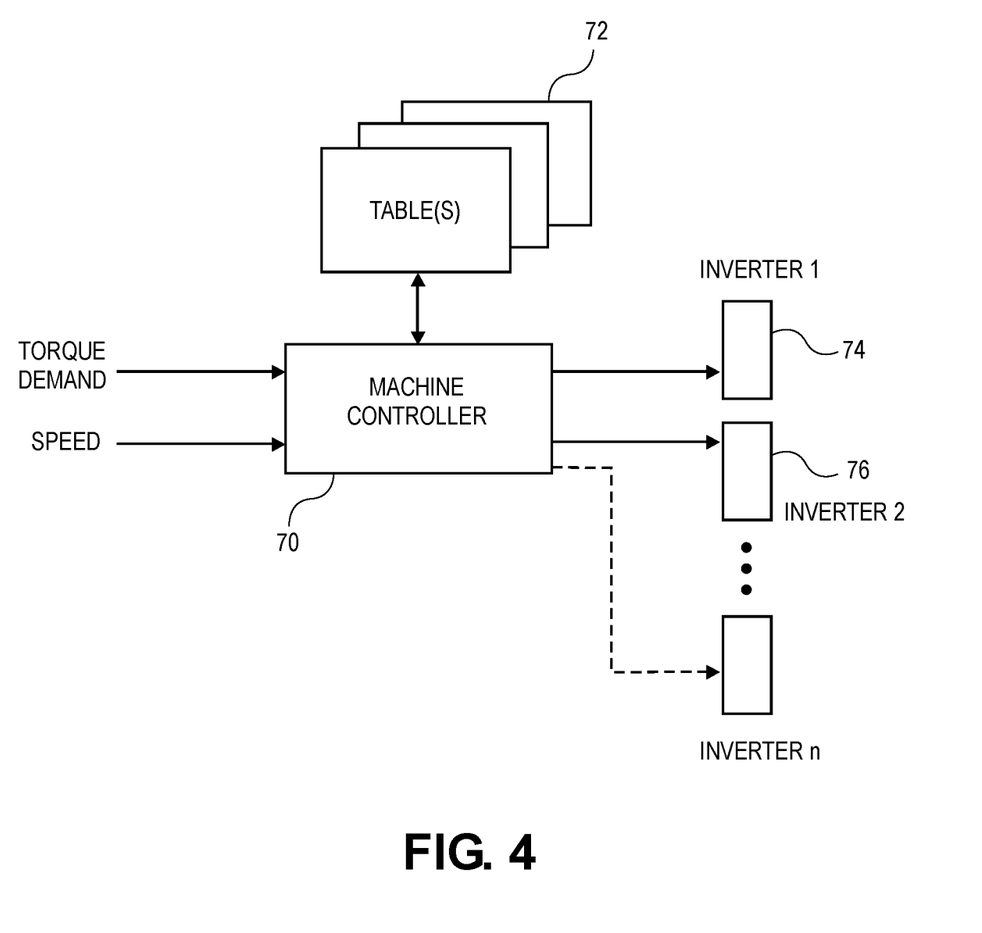
FIG. 4 illustrates an electric machine controller for controlling the multiple electric machine assembly of the present invention.

Referring to FIG. 4, a controller 70 for controlling a multiple electric machine assembly (such as any of the assemblies described herein) while motoring is illustrated. The controller 70 is arranged to receive a requested demand and an input indicative of a given speed of the electric machine assembly. In response, the controller 70 accesses one or more tables 72 and generates control signals for controlling the individual inverters respectively. In the particular embodiment shown, there are (n) inverters for individually controlling (n) motors respectively. It should be understood that the number (n) may widely vary from a minimum of two (2) to any number (n). In addition, it should be understood that the individual motors can be exclusively radial, exclusively axial, or any combination of one or more axial motors operating in cooperation with one or more radial motors.

In non-exclusive embodiments, the tables 72 are generated from empirical data collected by testing the electric machines of a given multiple electric machine assembly. During such testing, each electric machine is exercised over a wide range of speeds and torque demands. As the electric machines are tested over a wide range of operating conditions, ideal or preferred inverter control values are defined for a wide range of torque demands and speed value combinations. The tables 72 are then constructed by tabulating the ideal or preferred inverter control values for individually controlling the (n) individual electric machines over the wide range of torque demands and speeds.

During motoring operation, the controller 70 accesses the tables 72 to acquire the ideal or preferred inverter control values for each of the n electric machines for a given torque demand and speed combination. In response, the controller 70 then generates commensurate control signals for each of the inverters 1 through (n). In response, each of the (n) electric machine(s) are individually, but cooperatively controlled, to implement the above-defined multi-prong strategy or some other strategy that ideally improves efficiency, while meeting a required output demand and without generating excessive amounts of Noise, Vibration and Harshness (NVH). By cooperatively operating the (n) electric machine(s) together, the assembly can often generate a requested output more efficiently, and with less NVH, than if any one electric machine attempted to generate the same output alone. In addition, by having two or more electric machines, commonly housed and directly driving a common shaft, NVH is typically further reduced compared to using multiple, separately house machines each driving separate shafts that in turn drive a common load using gears and/or other linkages.

The above description is provided in the context any multiple electric machine assembly and should not be construed as limiting to those explicitly described herein. It should be understood that multiple machine assembles including any number (n) of individual electric machines, either radial, axial or any number or combination thereof, may be cooperatively controlled in a similar manner as described herein.

Power Inverter Circuit

A representative power inverter for a three-phase AC type electric machine includes a switching network. The switching network typically includes, coupled in series between two voltage buses ($+V_{BUS}$) and ($-V_{BUS}$), a first pair of switches S1 and S2 for phase A, switches S3 and S4 for phase B and switches S5 and S6 for phase C. When operating as a motor, power from a DC supply is provided via the switching network of switches S1-S6. In turn, the switching network provides phased energy to the three phases of stator windings of the electric machine as previously described. Alternatively, when operating as a generator, the energy flow is from the electric machine to a storage device, such as a battery.

Permanent Magnets, BEMF and Field Weakening

For certain applications, including battery powered vehicles including hybrids, electric machines with rotor designs using permanent magnets are common. Such electric machines include, but are not limited to, permanent magnet assisted synchronous reluctance motor and Internal Permanent Magnetic (IPM) motors. While such electric machines are generally efficient and relatively inexpensive, and therefore advantageously used in electrical vehicle applications, they have some issues that are less than ideal.

When an electric machine with a rotor design using permanent magnets is energized, its rotor begins to rotate in sync with the stator magnetic field. The rotating permanent magnets of the rotor, in turn, induce an electromagnetic force or "EMF" in the stators windings, commonly referred to as back EMF or "BEMF". BEMF acts against the applied voltage that causes the stator current to flow, and hence, causes the rotor to spin in the first place. As a result, the current flowing in the stator falls to zero as the BEMF approaches the applied voltage to the electric machine so naturally limiting the shaft speed.

The maximum BEMF of an inverter driven electric machine is limited by the inverter DC power supply when operating as a motor. When operating as a generator, there is no such limit and it is possible for uncontrolled regeneration stator current to flow. This current will induce an uncontrolled and unwanted negative torque on the shaft.

Field weakening is a known technique used to reduce the negative effects of BEMF. By reducing or weakening the magnetic field, BEMF is reduced. By reducing BEMF to less than the inverter supply voltage, controlled current is allowed to flow to the motor at speeds where without field weakening, BEMF is greater than battery voltage.

If the BEMF of a given electric machine exceeds the inverter supply voltage when the inverter is deactivated, an uncontrolled rectified current is returned to the DC supply. As a result, the electric machine will generate a retarding torque. When an electric machine is deactivated, potentially three options may be used. These options include:

(1) Let the uncontrolled rectified current returned to the DC supply, generating additional stored energy at the expense of torque;

(2) As noted above, this negative effect of BEMF can be mitigated by field weakening at a cost of input currents for field weakening. Thus, by maintaining the inverter activated, demanding zero torque, while applying field weakening, the retarding torque output of the electric machine is eliminated or reduced; and (3) Design the electric machine such that the predicted BEMF is never higher than the DC supply voltage for the entire operating speed of a multiple electric machine assembly.

Augmented Inverter Circuit

Figure 5:
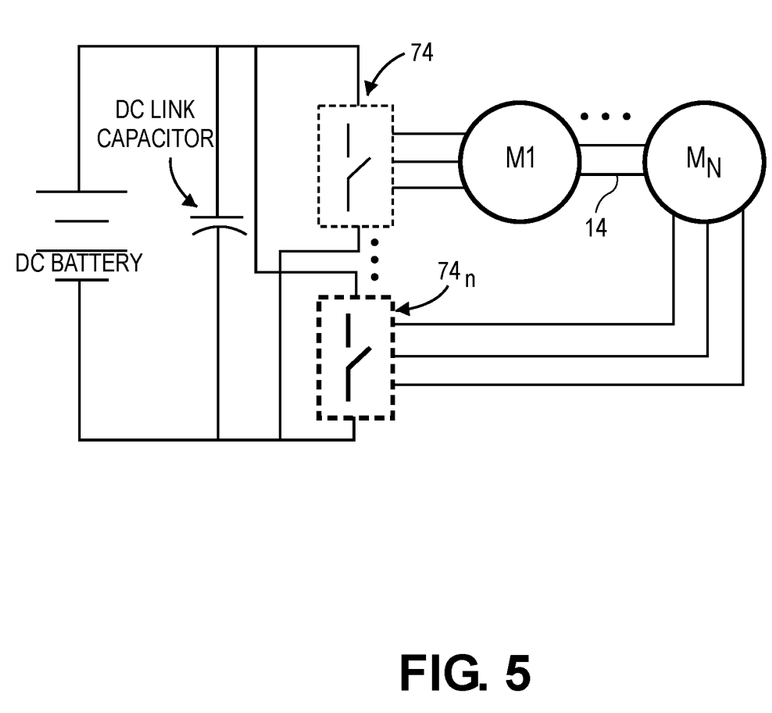
FIG. 5 illustrates a pair of inverters for individually, but cooperatively controlling, two electric machines of the multiple electric machine assembly in accordance with a non-exclusive embodiment of the invention.

Referring to FIG. 5, inverters 74 through 74n individually, but cooperatively, controlling machines M1 through Mn respectively. Each of the inverters 74 through 74n is powered by a DC power supply (e.g., a DC battery, capacitor or other DC power supply) and includes a switching network (not shown) for providing phased energy to the stator windings of the electric machines M1 through Mn respectively as is well known in the art. In various embodiments, the machine M1 through Mn may each be any type of machine, including radial, axial, or any combination thereof, that may or may not include rotors, machines that rely on permanent magnets, etc. With those implementations that do not rely on permanent magnets, back electromagnet force ("BEMF") is ordinarily not an issue.

With certain implementations using permanent magnet rotor designs, BEMF may be an issue when a radial electric machine (e.g., M1) is activated, but an axial electric machine (e.g., Mn) is deactivated. When this situation occurs, the common shaft 14 is directly driven or turned by the radial electric machine M1, which in turn, rotates the rotor of the axial electric machine Mn. As the rotor of the axial electric machine spins, BEMF may be generated. If the amount of BEMF exceeds the supply voltage provided by the DC battery, then the axial electric machine Mn may begin to operate as a generator, producing an uncontrolled and/or unwanted negative torque applied to the shaft.

As illustrated in FIG. 5, an augmented inverter circuit 74n for the axial electric machine Mn in this example is provided, including a DC link capacitor. During situations when the radial electric machine M1 is activated, but the axial electric machine Mn is not, the DC link capacitor is used to store excess energy generated by the axial electric machine Mn due to excessive BEMF. As a result, the DC battery supply is not exceeded, either altogether, or to a degree that is reduced. In addition, the inverter 74n may also apply field weakening. As a result, the axial electric machine Mn is altogether prevented from operating as a generator or the extent to which the axial electric machine Mn acts a generator is reduced. Any negative torque applied to the common shaft 14 is therefore avoided or mitigated. In alternative embodiments, the DC link capacitor can be a separate capacitor or included in the DC power supply or battery.

On the other hand when both the radial electric machine M1 and the axial electric machine Mn are actively operating, BEMF is generally not an issue. In which case, the DC link capacitor is not used to store excess energy and the two inverters 74, 74n operate normally so as to independently, but cooperatively, control the two electric machines.

Core losses is another concern with electric machine designs with magnet based designs. Even though an electric machine is deactivated and there is no-current, there still may be core losses because of the permanent magnet of the rotor design may result in a changing magnetic flux in the stator core. As a result, iron losses may occur. To address this issue, electric machines can be designed to minimize core losses. For example, if a permanent magnet based motor have slot-less configuration then it will produce much lower BEMF and core-loss compared to a regular configuration with slots. Another example can be, using magnet in one motor only which will be activated in all the operating points (or at least in most of the operating points), all other motors in the multi-motor are magnet-free, so there will be no-core loss in motor which is not active.

Machine Assembly Cooling

Figure 6:
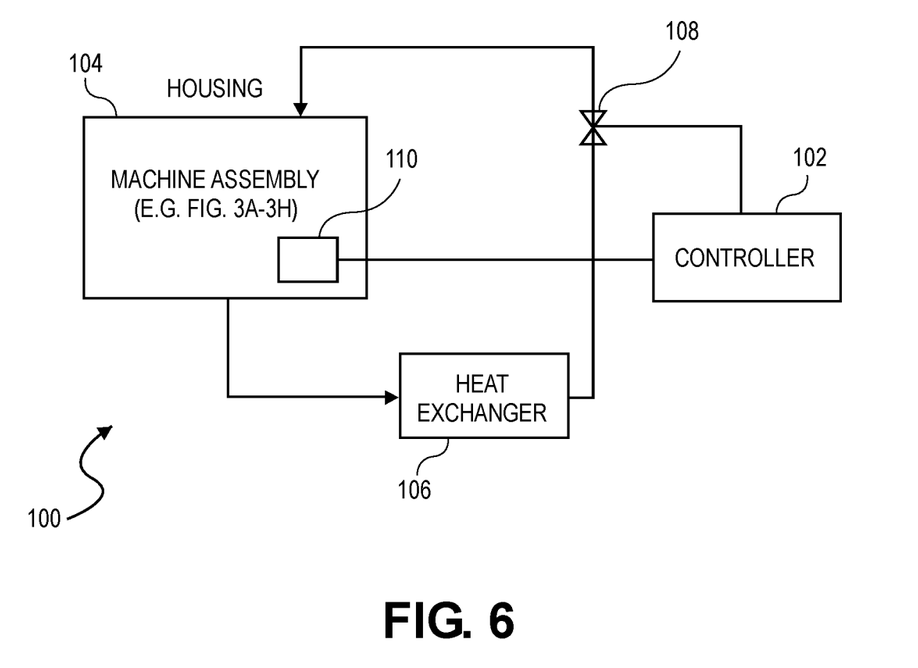
FIG. 6 is a block diagram of a system for controlling cooling of a multiple electric machine assembly in accordance with a non-exclusive embodiment of the invention.

Referring to FIG. 6, a block diagram of a system 100 for controlling cooling of a multiple electric machine assembly is illustrated. The system 100 includes a controller 102, a common housing 104 for housing a machine assembly (e.g., any of the embodiments 3A-3H as described herein) for directly driving a common shaft (not illustrated), a heat exchanger 106, a pump 108 and a temperature sensor 110 maintained in or adjacent to the housing 104.

During operation, the temperature sensor 110 measures the temperature within the housing 104 and provides temperature sample readings to the controller 102. As the temperature within the housing 104 increases, the controller activates and controls the pump 108, which pumps a cooling fluid into the housing. The cooling fluid then passes through the housing 104, removing the heat generated by the multiple electric machine assembly. The heated fluid then exits the housing 104 and is then passed through the heat exchanger 106, which removes the heat from the cooling fluid. The cooled fluid is thereafter ready to be recirculated back into the housing 104 by the pump 108.

Depending on the temperature readings by the sensor 100, the controller 102 is able to control or modulate the rate at which the cooling fluid is pumped through the housing 104. When the multiple electric machine assembly generates excessive heat, the rate at which the cooling fluid is pumped by the pump 108 is increased. When the temperature readings are brought down to an acceptable temperature, the pumping rate can be reduced. As such, by controlling or modulating the pumping rate of the pump 108, the controller 102 can maintain the temperature of the individual machines of the machine assembly within the housing 104 at a desired temperature or temperature range.

In applications such as Electric Vehicles (EV), high power density is very crucial, the coolant of the cooling system is often circulated around the stator winding or shower on the end winding. With this multi-motor arrangement, the end winding of one motor will be close to the end winding of other motors. Thus, same coolant inlet pipe can be used with multiple nozzles to direct and control the spraying of the coolant on the end winding of the axial flux motor and radial flux motor. In that way, it is possible to make coolant path smaller, which will lower the system cost.

Figure 7:
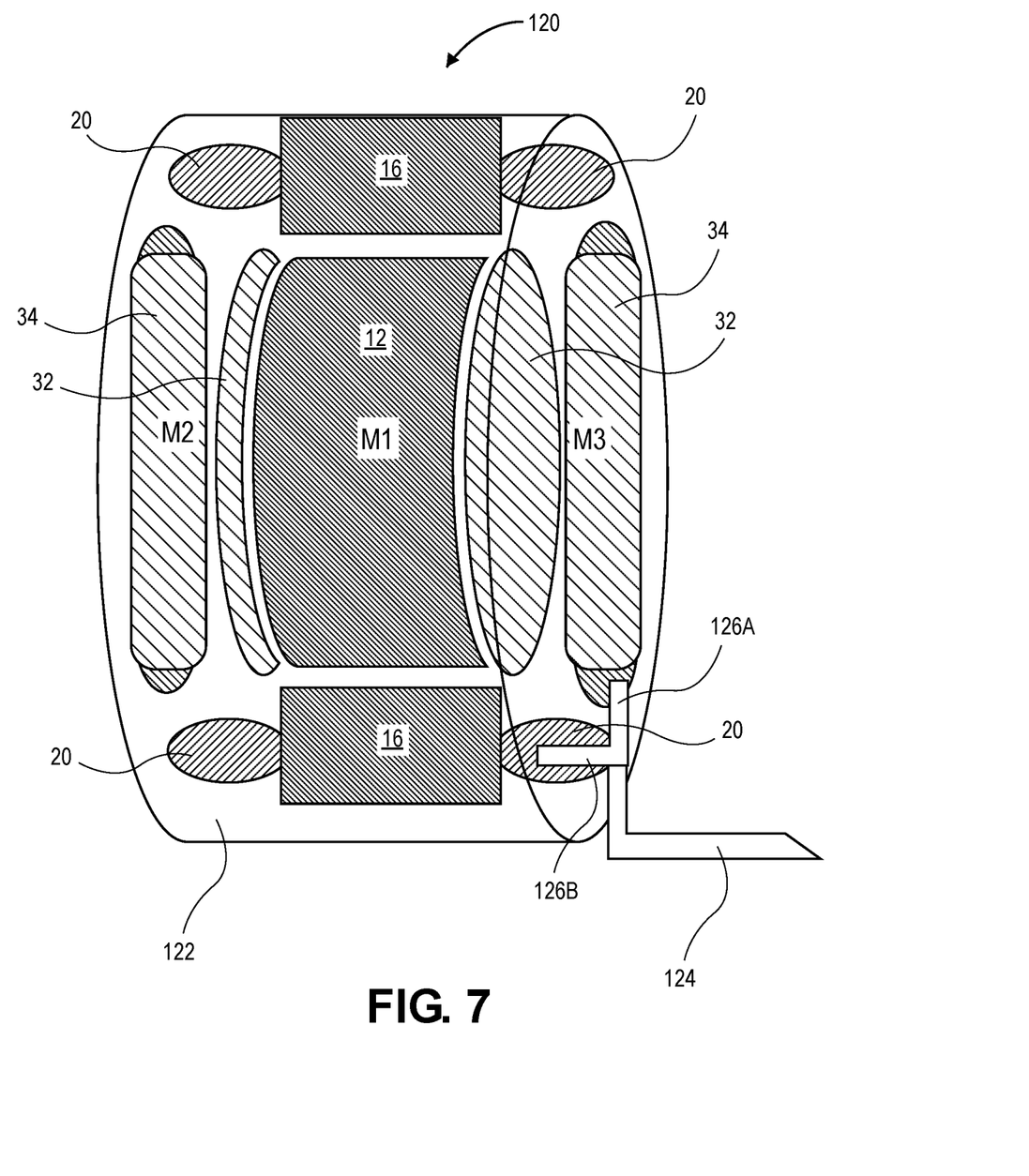
FIG. 7 is a diagram illustrating an exemplary multiple electric machine assembly having a common housing and a single coolant inlet with multiple spray nozzles for axial and radial flux machines in accordance with a non-exclusive embodiment of the invention.

Referring to FIG. 7, an exemplary multiple electric machine assembly 120 is shown. In this particular non-exclusive embodiment, the electric machine assembly 120 includes a radial flux motor M1 and two axial flux motors M2 and M3 each configured to directly drive a common shaft 14. The machine assembly is contained in a housing 122. In various embodiments, the housing 122 can be of any shape (e.g., box, cylindrical, round, etc.), can be a single integral structure or may include multiple external segments that are affixed to one another, and/or may include a single internal chamber to house all electric machines M1-M3 or multiple internal chambers to house one or more of the electric machines M1-M3. The machine assembly also includes a single coolant inlet 124 and multiple spray nozzles 126A and 126B. In the particular embodiment shown, the nozzle 126A is arranged to spray coolant on the axial flux motor M3 and the nozzle 126B is arranged to spray coolant on the axial flux motor M2 and M3.

It should be understood that the embodiment shown in FIG. 7 is merely exemplary and should not be construed as limiting in any regard. In particular, the housing can be used to house any number, type or combination of multiple axial and/or radial motors, such as but not limited to those described herein. In addition, the number of coolant inlets is not necessarily limited to just one. On the contrary with electric machine assemblies with a large number of machines, it may be advantageous to have multiple coolant inlets as well, each feeding one or more spray nozzles. In this way, coolant can be readily distributed to where it is needed within the machine assembly. Furthermore, with multiple nozzles, each can be individually controlled based on individual electric machine usage and heat generation.

Advantages

The electric machine assemblies as described herein offer a number of benefits and advantages. First, the assemblies are generally is capable of operating at higher efficiencies over of a wider operating range, than previous designs with either one electric machine or two separate and distinct electric machines. Second, the machine assemblies, housed in a single housing, offers increased output power density for driving a common shaft connected to a load compared to two similar, but separate housed motors, that independently drive separate shafts that are connected to a common load, typically through gears and/or linkages. Thus, having two (or more) motors individually controlled, but housed in a common housing and directly driving or turning a common shaft provides a high level of output power in a highly compact package. To obtain the same level of output power from same-sized, separately housed, radial and flux electric machines, the "footprint" of the two housing will be significantly larger than with the single housing design of the present application. Third, the ability to cooperatively operate the radial and axial electric machines 10, 30 helps reduce NVH. For example, each of the radial flux machine 30 and the axial flux machine(s) 30 can be individually used when operating conditions are in the "sweet spot" efficiency region of each respectively. That is, the radial flux electric machine 10 is operated alone regardless of the torque demand and the speed is relatively high and the axial flux electric machine(s) 30 is/are operated alone when torque demand is relatively low and the speed is relatively low. On the other hand, when the torque demand is high, but the speed is relatively low, then both machines are operated. Since both electric machines are used, NVH can be reduced compared to operating either an axial or radial electric machine independently to meet the demand.

Alternative Embodiments

In the above-described non-exclusive embodiment, the radial flux electric machine is a synchronous reluctance machine and the axial flux electric machine is a surface permanent magnet electric machine. This particular embodiment, however, is not exclusive and many other embodiments may be used.

For instance, the axial flux electric machine may be selected from the group including, but not limited to of (a) Surface Mounted Permanent (SMP) magnet electric machine, (b) a switched reluctance electric machine or (c) an Interior Permanent Magnet (IPM) motor. Similarly, the radial flux electric machine may be selected from, but not limited to, the group including (d) an IPM motor, (e) a Permanent Magnet Assisted Synchronous Reluctance motor, (f) a synchronous reluctance motor, (g) Permanent Magnet Assisted Synchronous Reluctance Machine or (h) an Induction Motor (IM).

Table I below includes a number of possible embodiments that may be implemented. In each case, comments are provided as the advantages to each combination.

TABLE I

| Axial Flux Motor | Radial Flux Motor | Comment |
| --- | --- | --- |
| SPM motor | Interior Permanent Magnet( IPM) Motor | High-power density and high-efficiency drive |
| SPM Motor | Permanent Magnet assisted Synchronous Reluctance Motor (PMaSynRM) | High power, high efficiency low cost drive |
| Switched Reluctance Motor | IPM Motor | No issue of dealing with BEMF of axial flux motor. Can be only four phases as SRM can be single phase |
| Switched Reluctance Motor | PMaSynRM | Very low-cost drive, No issue of dealing with BEMF of axial flux motor. Can be only four phases as SRM can be single phase |
| Switched Reluctance Motor | Synchronous Reluctance Motor | Very low-cost drive, No issue of dealing with BEMF of axial flux motor. Can be only four phases as SRM can be single phase |
| Induction Motor (IM) | Synchronous Reluctance Motor | No issue of dealing with BEMF of axial flux motor. Can be only four phases as IM can be single phase |
| Induction Motor (IM) | PMaSynRM | No issue of dealing with BEMF of axial flux motor. Can be only four phases as IM can be single phase |
| Induction Motor (IM) | IPM Motor | No issue of dealing with BEMF of axial flux motor. Can be only four phases as IM can be single phase |
| Synchronous Reluctance Motor | PMaSynRM | No issue of dealing with BEMF of axial flux motor. |
| Synchronous Reluctance Motor | IPM Motor | No issue of dealing with BEMF of axial flux motor. |
| Switched Reluctance Motor | Switched Reluctance Motor | |
| PMaSynRM | Switched Reluctance Motor | |
| SynRM | Switched Reluctance Motor | |
| SPM | Switched Reluctance Motor | |
| IPM | Switched Reluctance Motor | |

Although only a few embodiments of the invention have been described in detail, it should be appreciated that the invention may be implemented in many other forms without departing from the spirit or scope of the invention. For example, in much of the discussion above, separate inverters are provided to facilitate individual control of the separate electric machines—e.g., the axial flux electric machine and the radial flux electric machine; distinct axial flux electric machines or distinct radial flux electric machines and/or various combinations thereof. As will be appreciated by those familiar with inverter design, similar individual electric machine control can be attained through the use of a single inverter having additional phase control. For example, a 3-phase axial flux machine and a 3-phase radial flux machine can be controlled by a single inverter having six phases. In this arrangement, three of the inverter phases drive the axial flux machine and the other three of the inverter phases drive the radial flux machine. Similarly, three 3-phase electric machines can be independently controlled by a 9 phase inverter, and so on. As such, in various embodiments, the inverter unit may take the form of multiple independent inverters, or a single inverter configured to independently control two or more of the described electric machines integrated into a single housing as described, as for example an axial flux machine integrated with a radial flux machine. In still other embodiments, an inverter unit comprising two inverters could be used to control 3 or more of the described electric machines, and so on. Therefore, the present embodiments should be considered illustrative and not restrictive and the invention is not to be limited to the details given herein but may be modified within the scope and equivalents of the appended claims.

What is claimed is:

1. An electric machine assembly comprising:
   a shaft;
   an axial flux electric machine having a first rotor configured to directly drive the shaft, wherein the axial flux electric machine is a switched reluctance electric machine or an induction electric machine;
   a radial flux electric machine having a second rotor configured to directly drive the shaft, the radial flux electric machine being magnetically decoupled from the axial flux electric machine, wherein the radial flux electric machine is a synchronous reluctance electric machine or a permanent magnet assisted synchronous reluctance electric machine;
   a housing for housing both the axial flux electric machine and the radial flux electric machine and at least a portion of the shaft; and
   an inverter unit configured to separately control the axial flux electric machine and the radial flux electric machine.

2. The electric machine assembly as recited in claim 1 wherein the axial flux electric machine is a switched reluctance electric machine.

3. The electric machine assembly as recited in claim 2 wherein the radial flux electric machine is a synchronous reluctance electric machine.

4. The electric machine assembly as recited in claim 2 wherein the radial flux electric machine is a permanent magnet assisted synchronous reluctance electric machine.

5. The electric machine assembly as recited in claim 1 wherein the radial flux electric machine is a synchronous reluctance electric machine.

6. The electric machine assembly as recited in claim 1 further comprising a first gap provided between the first rotor of the radial flux electric machine and the second rotor of the axial flux electric machine, the first gap sufficiently large so that radial flux generated by the radial flux electric machine and axial flux generated axial flux electric machine are effectively magnetically decoupled from one another.

7. The electric machine assembly of claim 6, wherein the first gap is an air gap.

8. The electric machine assembly of claim 6 wherein the first gap is at least partially filled with a non-magnetic material.

9. The electric machine assembly of claim 6, wherein the first gap is at least 2 millimeters.

10. The electric machine assembly of claim 6, further comprising a magnetic shield provided in the first gap to aid in magnetically decoupling the axial flux electric machine and the radial flux electric machine.

11. The electric machine assembly of claim 1, further comprising a magnetic shield provided in the first gap to aid in magnetically decoupling the axial flux electric machine and the radial flux electric machine.

12. The electric machine assembly of claim 1, wherein the radial flux electric machine has a first number of poles and the axial flux electric machine has a second number of poles and the first number of poles and the second number of poles are different.

13. The electric machine assembly of claim 1, further comprising a second axial flux electric machine arranged to directly drive the shaft, wherein the axial flux electric machine and the second axial flux electric machine are located on opposing sides of the radial flux electric machine.

14. An electric machine assembly as recited in claim 1 further comprising a storage device arranged to store excess BEMF energy generated by the axial flux electric machine when deactivated while the radial flux electric machine is activated.

15. An electric machine assembly as recited in claim 1 wherein the inverter unit is configured to operate at least one of the axial and radial motors in a pulsed operational mode.

16. An electric machine assembly comprising:
    a shaft;
    an axial flux electric machine having a first rotor configured to directly drive the shaft;
    a radial flux electric machine having a second rotor configured to directly drive the shaft;
    a first gap provided between the axial flux electric machine and the radial flux electric machine, the first gap sufficiently large to effectively magnetically decouple the axial flux electric machine and the radial flux electric machine from one another, wherein the first gap is provided between the first rotor of the radial flux electric machine and the second rotor of the axial flux electric machine, the first gap sufficiently large so that radial flux generated by the radial flux electric machine and axial flux generated axial flux electric machine are effectively magnetically decoupled from one another;
    a housing for housing both the axial flux electric machine and the radial flux electric machine and at least a portion of the shaft; and
    an inverter unit configured to separately control the axial flux electric machine and the radial flux electric machine.

17. The electric machine assembly of claim 16, wherein the first gap is an air gap.

18. The electric machine assembly of claim 16, wherein the first gap is at least partially filled with a non-magnetic material.

19. The electric machine assembly of claim 16, wherein the inverter unit is capable of: (i) directing operation of the axial flux machine while the radial flux machine is deactivated; (ii) directing operation of the radial flux machine while the axial flux machine is deactivated; and directing concurrent and independent operation of the axial flux electric machine and the radial flux machine based on a requested demand at a given speed respectively.

20. The electric machine assembly of claim 19, inverter unit is configured to:
    (a) operate the axial electric machine alone when speed is relatively low and the torque demand is relatively low;
    (b) operate the radial electric machine alone when the speed is relatively high and regardless of the torque demand; and
    (c) operate both the axial electric machine and the radial electric machine when the torque demand is high, and speed is low.

21. The electric machine assembly of claim 16, wherein the first gap is at least 2 millimeters.

22. The electric machine assembly of claim 16, wherein the radial flux electric machine has a first number of poles and the axial flux electric machine has a second number of poles and the first number of poles and the second number of poles are different.

23. The electric machine assembly of claim 16, further comprising a second axial flux electric machine arranged to directly drive the shaft, wherein the axial flux electric machine and the second axial flux electric machine are located on opposing sides of the radial flux electric machine.

24. The electric machine assembly of claim 16, further comprising a second axial flux electric machine configured to directly drive the shaft, wherein the axial flux electric machine and the second axial flux electric machine are located on a same side of the radial flux electric machine.

25. The electric machine assembly of claim 16, further comprising a second radial flux machine configured to directly drive the shaft, wherein the axial flux electric machine is located between the radial flux machine and the second radial flux machine.

26. The electric machine assembly of claim 16, further comprising a magnetic shield provided in the first gap to aid in magnetically decoupling the axial flux electric machine and the radial flux electric machine.

27. An electric machine assembly as recited in claim 16, further comprising a storage device arranged to store excess BEMF energy generated by the axial flux electric machine when deactivated while the radial flux electric machine is activated.

28. An electric machine assembly as recited in claim 16, further comprising a cooling system configured to cool the axial flux electric machine and the radial flux electric machine by circulating a cooling fluid through the housing.

29. The electric machine assembly of claim 16, wherein the axial flux machine is a Switched Reluctance Electric Machine and the radial flux machine is a Synchronous Reluctance Electric Machine.

30. The electric machine assembly of claim 16, wherein the axial flux machine is a Switched Reluctance Electric Machine and the radial flux machine is a Permanent Magnet assisted Synchronous Reluctance Electric Machine.

31. The electric machine assembly of claim 16, wherein the axial flux machine is an Induction Electric Machine and the radial flux machine is a Synchronous Reluctance Electric Machine or a Permanent Magnet assisted Synchronous Reluctance Electric Machine.

* * * * *